US009058311B1

(12) United States Patent
Bertz et al.

(10) Patent No.: US 9,058,311 B1
(45) Date of Patent: Jun. 16, 2015

(54) USER TIMEFRAME SELECTION FOR DELIVERY OF MEDIA RESOURCES

(75) Inventors: Lyle T. Bertz, Lee's Summit, MO (US); Daniel Joe Sershen, Overland Park, KS (US); James Walter Norris, Kansas City, MO (US); Jeffrey J. Klaumann, Frisco, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 492 days.

(21) Appl. No.: 13/569,279

(22) Filed: Aug. 8, 2012

(51) Int. Cl.
*G06F 17/00* (2006.01)
*G06F 17/22* (2006.01)
*G06F 17/30* (2006.01)

(52) U.S. Cl.
CPC ...... *G06F 17/2235* (2013.01); *G06F 17/30846* (2013.01)

(58) Field of Classification Search
CPC .......... G06F 17/2235; G06F 17/30846; G06F 17/30858
USPC .................................................. 715/205, 207
See application file for complete search history.

(56) References Cited

U.S. PATENT DOCUMENTS

| 6,177,931 | B1 * | 1/2001 | Alexander et al. .............. 725/52 |
| 7,558,797 | B2 | 7/2009 | Li |
| 7,593,943 | B2 | 9/2009 | Clarke et al. |
| 7,613,770 | B2 | 11/2009 | Li |
| 7,665,109 | B2 * | 2/2010 | Matthews et al. ................ 725/51 |
| 7,870,108 | B2 | 1/2011 | Gole et al. |
| 2002/0120648 | A1 | 8/2002 | Ball et al. |
| 2004/0243479 | A1 * | 12/2004 | Gross .............................. 705/26 |
| 2005/0044223 | A1 * | 2/2005 | Meyerson ..................... 709/225 |
| 2005/0283734 | A1 | 12/2005 | Santoro et al. |
| 2006/0136383 | A1 * | 6/2006 | Golla ................................ 707/3 |
| 2006/0265427 | A1 * | 11/2006 | Cohen et al. .................. 707/200 |
| 2007/0011704 | A1 * | 1/2007 | Anglin, Jr. ...................... 725/46 |
| 2008/0235331 | A1 * | 9/2008 | Melamed et al. ............. 709/204 |
| 2010/0153572 | A1 * | 6/2010 | Feig et al. ..................... 709/231 |
| 2014/0380379 | A1 * | 12/2014 | Klappert et al. ................ 725/58 |
| 2015/0026252 | A1 * | 1/2015 | Eyal et al. ..................... 709/203 |

\* cited by examiner

*Primary Examiner* — Cong-Lac Huynh

(57) ABSTRACT

Systems, methods, and software for operating a user communication device are provided herein. In a first example, method of operating a user communication device is provided which includes displaying a HTTP link associated with a media resource and receiving a user selection of the displayed HTTP link. The method also includes displaying a delivery time schedule menu for the media resource responsive to the user selection of the displayed HTTP link, and receiving a delivery time schedule instruction indicating a user-acceptable time frame for receipt of the media resource. The method also includes generating and transferring an HTTP request packet with an HTTP header that indicates the user-acceptable time frame for receipt of the media resource into the user communication device, and receiving the media resource associated with the HTTP link according to the delivery time schedule instruction and responsive to the HTTP header in the transferred HTTP request packet.

20 Claims, 3 Drawing Sheets

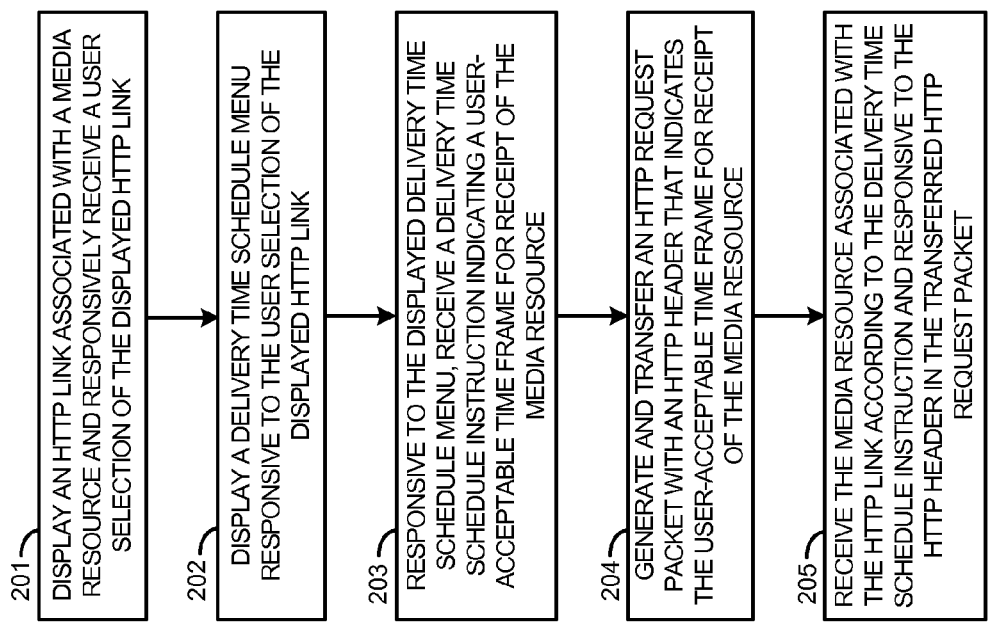
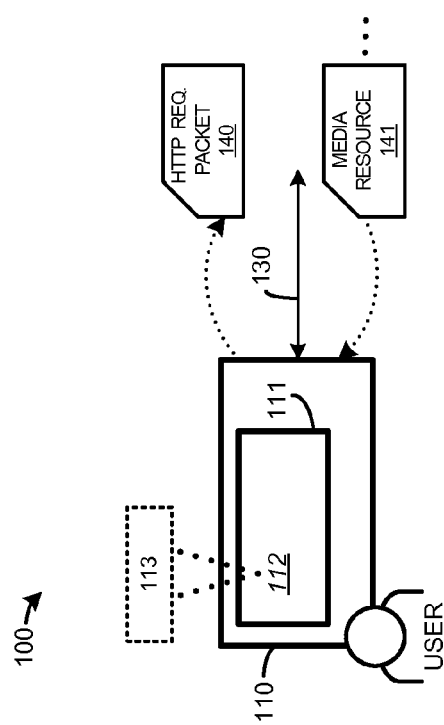

USER TIMEFRAME SELECTION FOR DELIVERY OF MEDIA RESOURCES

TECHNICAL FIELD

Aspects of the disclosure are related to the field of communications, and in particular, delivery of media resources associated with hypertext transfer protocol (HTTP) links in communication networks.

TECHNICAL BACKGROUND

User communication devices, such as personal computers, smartphones, tablet computers, and the like, can be used to access media resources over communication networks, such as the Internet. These media resources can be presented to a user of the user communication device via a Hypertext Transfer Protocol (HTTP) link, or hyperlink, in a web page, for example. Via a user interface device, a user can select the hyperlink and browse to the media resource associated with the hyperlink. In some cases, the hyperlink instead initiates a download of the media resource, such as a video file, audio file, picture, or other media resource.

However, selecting the hyperlink may initiate an unwanted or immediate download of the associated media resource. This immediate download can impede network performance for other user communication devices on a similar network as the original user communication device. Also, the device or system which provides the media resource may be overloaded and thus unable to serve the media resource quickly.

Overview

Systems, methods, and software for operating a user communication device are provided herein. In a first example, a method of operating a user communication device having a graphical display is provided. The method includes displaying a Hypertext Transfer Protocol (HTTP) link associated with a media resource and responsively receiving a user selection of the displayed HTTP link, displaying a delivery time schedule menu for the media resource responsive to the user selection of the displayed HTTP link, and responsive to the displayed delivery time schedule menu, receiving a delivery time schedule instruction on the user communication device indicating a user-acceptable time frame for receipt of the media resource in the user communication device. The method also includes generating and transferring an HTTP request packet with an HTTP header that indicates the user-acceptable time frame for receipt of the media resource into the user communication device, and receiving the media resource associated with the HTTP link according to the delivery time schedule instruction and responsive to the HTTP header in the transferred HTTP request packet.

In another example, a computer readable medium having stored thereon program instructions executable by a user communication device is provided. When executed by the user communication device, the program instructions direct the user communication device to display a HTTP link associated with a media resource and responsively receive a user selection of the displayed HTTP link. The program instructions also direct the user communication device to display a delivery time schedule menu for the media resource responsive to the user selection of the displayed HTTP link, and responsive to the displayed delivery time schedule menu, receive a delivery time schedule instruction on the user communication device indicating a user-acceptable time frame for receipt of the media resource in the user communication device. The program instructions also direct the user communication device to generate and transfer an HTTP request packet with an HTTP header that indicates the user-acceptable time frame for receipt of the media resource into the user communication device, and receive the media resource associated with the HTTP link according to the delivery time schedule instruction and responsive to the HTTP header in the transferred HTTP request packet.

In another example, a user communication device is provided. The user communication device includes a graphical display configured to display a HTTP link associated with a media resource and a user interface configured to receive a user selection of the displayed HTTP link. The graphical display is configured to display a delivery time schedule menu for the media resource responsive to the user selection of the displayed HTTP link. Responsive to the displayed delivery time schedule menu, the user interface is configured to receive a delivery time schedule instruction on the user communication device indicating a user-acceptable time frame for receipt of the media resource in the user communication device. The user communication device also includes a network interface configured to generate and transfer an HTTP request packet with an HTTP header that indicates the user-acceptable time frame for receipt of the media resource into the user communication device, and the network interface configured to receive the media resource associated with the HTTP link according to the delivery time schedule instruction and responsive to the HTTP header in the transferred HTTP request packet.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 1 is a system diagram illustrating a user communication device.

FIG. 2 is a flow diagram illustrating a method of operation of a user communication device.

DETAILED DESCRIPTION

Figure 3:
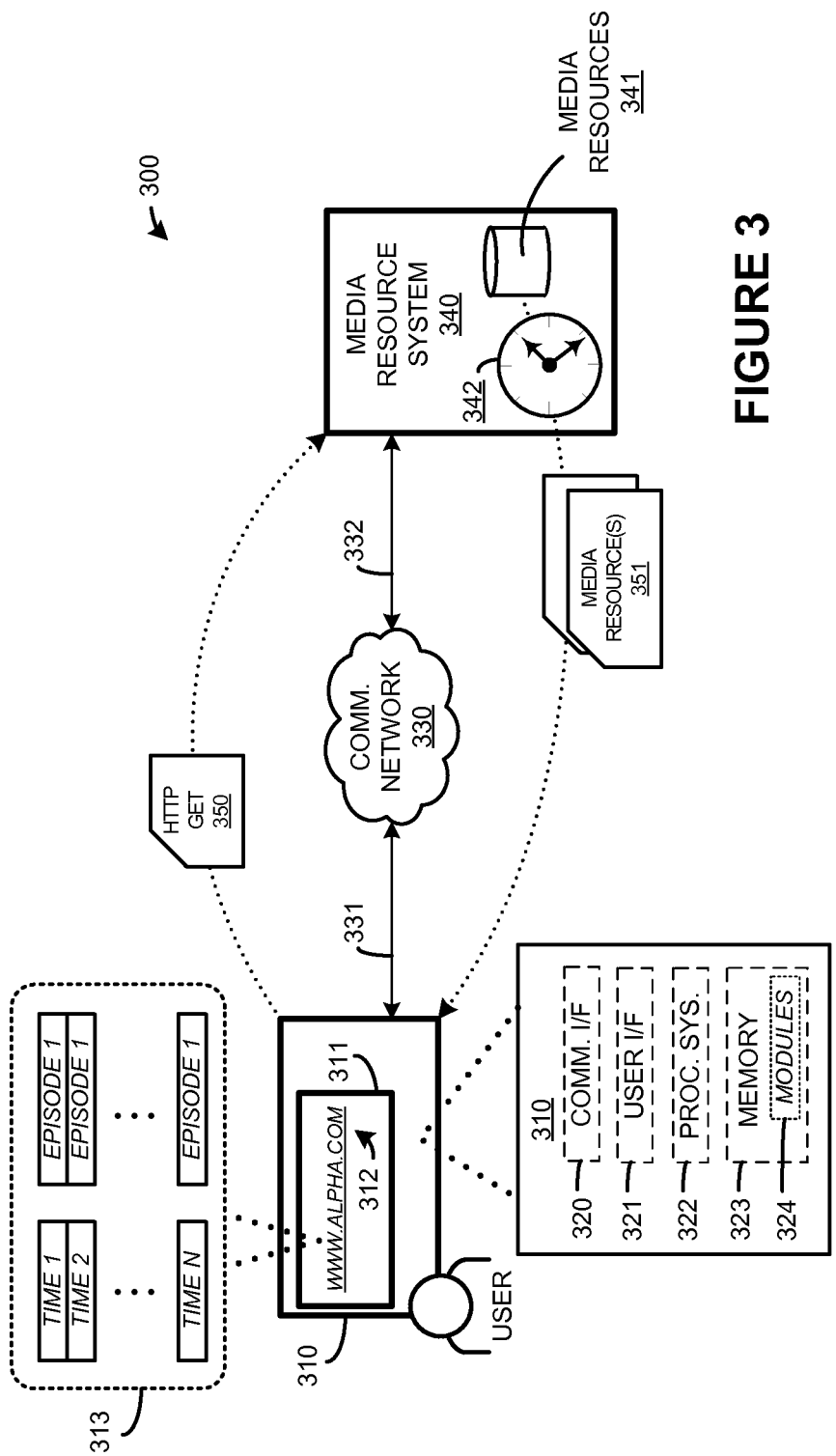
FIG. 3 is a system diagram illustrating a communication system.

FIG. 1 is a system diagram illustrating communication system 100. Communication system 100 includes user communication device 110, Hypertext Transfer Protocol (HTTP) request packet 140, media resource 141, and communication link 130. User communication device 110 can communicate with other communication systems or networks over communication link 130. These other communication systems or networks are not shown in FIG. 1 for clarity. User communication device 110 includes graphical display 111. In operation, graphical display 111 of user communication device 110 can display at least HTTP link 112 and delivery time schedule menu 113. Graphical display 111 of user communication device 110 can also typically display web pages, application user interfaces, pictures, text, video, or other content and media resources, including combinations thereof.

FIG. 2 is a flow diagram illustrating a method of operation of user communication device 110. The operations of FIG. 2 are referenced herein parenthetically. In FIG. 2, user communication device 110 displays (201) HTTP link 112 associated with a media resource and responsively receives a user selection of displayed HTTP link 112. In this example, HTTP link 112 is displayed on graphical display 111 of user communication device 110. HTTP link 112, along with other HTTP links, can be presented in an application, such as a web browser, executed on user communication device 110. User communication device 110 can receive the user selection of displayed HTTP link 112 via a user input device, such as a mouse, keyboard, touchscreen, voice command interface, or other user input device.

User communication device 110 displays (202) a delivery time schedule menu for the media resource responsive to the user selection of displayed HTTP link 112. In this example, delivery time schedule 113 is displayed responsive to the user selection of HTTP link 112 on user communication device 110. The user selection can include a mouse click, touch command, key press, gesture, voice command, or other user selection. Time schedule menu 113 can be displayed on graphical display 111, such as a popup menu, dialog box, or other menu or schedule presentation. Time schedule menu 113 can include a selection of times for delivery of the media resource, such as timeframes, days, hours, time preferences, or other delivery time representations, or can allow a user to specify a custom delivery time. In further examples, an episode selection menu is displayed for the media resource responsive to the user selection of displayed HTTP link 112.

Responsive to the displayed delivery time schedule menu, user communication device 110 receives (203) a delivery time schedule instruction on the user communication device indicating a user-acceptable time frame for receipt of the media resource in the user communication device. As discussed above, the user can select a delivery time from time schedule menu 113, or input a user-defined delivery time. This delivery time indicates a user-acceptable time frame for receipt of the media resource, such as an indication of a time or timeframe preferred by the user to receive the media resource.

User communication device 110 generates and transfers (204) an HTTP request packet with an HTTP header that indicates the user-acceptable time frame for receipt of the media resource into the user communication device. Generating the HTTP request packet can include creating an HTTP request packet including the delivery time schedule instruction and an identifier of the media resource. User communication device 110 transfers the HTTP request packet over communication link 130 for delivery to a system associated with delivering, serving, or streaming the media resource. In FIG. 1, HTTP request packet 140 includes an HTTP header. The HTTP header can include a field indicating the user-acceptable time frame. HTTP request packet 140 can also indicate the media resource selected by the user, and can be indicated by a uniform resource indicator (URI), uniform resource locator (URL), uniform resource name (URN), Internet Protocol (IP) address, domain name, host name, network address, port number, or other identifier, including combinations thereof. In some examples, HTTP request packet 140 is associated with an HTTP GET command or request, and the HTTP GET command or request can include a header field indicating the user-acceptable time frame. Although one representative packet for HTTP request packet 140 is shown in FIG. 1, it should be understood that one or more packets can comprise the HTTP request for the media resource.

User communication device 110 receives (205) the media resource associated with the HTTP link according to the delivery time schedule instruction and responsive to the HTTP header in the transferred HTTP request packet. User communication device 110 can receive the media resource over communication link 130 as transferred by a system associated with the media resource. Media resource 141 is shown in FIG. 1 as representing the media resource. Although one representative packet for media resource 141 is shown in FIG. 1, it should be understood that one or more packets can comprise the media resource. Once the media resource is received, user communication device 110 can display the media resource to a user on graphical display 111. In some examples, the media resource is stored for later presentation to the user, such as on a memory device of user communication device 110. In yet other examples, the media resource is streamed to user communication device 110 at a time indicated by the delivery time instruction.

FIG. 3 is a system diagram illustrating communication system 300. Communication system 300 includes user communication device 310, communication network 330, and media resource system 340. User communication device 310 and communication network 330 communicate over Internet Protocol (IP) network link 331. Communication network 330 and media resource system 340 communicate over IP network link 332.

A detailed view of user communication device 310 is illustrated in FIG. 3. User communication device can include similar elements as user communication device 110 in FIG. 1, although variations are possible. User communication device 310 includes communication interface 320, user interface 321, processing system 322, and memory 323. In operation, processing system 322 is operatively linked to communication interface 320, user interface 321, and memory 323. Processing system 322 is capable of executing software stored in memory 323, such as modules 324. When executing the software, processing system 322 drives user communication device 310 to operate as described herein.

Processing system 322 can be implemented within a single processing device but may also be distributed across multiple processing devices or sub-systems that cooperate in executing program instructions. Examples of processing system 322 include general purpose central processing units, microprocessors, application specific processors, and logic devices, as well as any other type of processing device.

Communication interface 320 includes equipment and systems for communication over network links and communication networks. Examples include network interface cards, network interface circuitry, transceivers, or other network interface equipment. In some examples, communication interface 320 can communicate over a wireless link, such as with wireless access nodes of a wireless communication system or cellular voice and data network. Examples of wireless equipment include antennas, power amplifiers, RF circuitry, transceivers, and other communication circuitry.

User interface 321 can have input devices such as a keyboard, a mouse, a voice input device, or a touch input device, and comparable input devices. Output devices such as graphical displays, touchscreens, speakers, printer, and other types of output devices may also be included with user interface 321. For example, in FIG. 3, user interface 321 includes graphical display 311 for displaying HTTP link 312 and various menus to a user of user communication device 310. User interface 321 may also be considered to be an integration of user communication device 310 with software elements, such as operating system and application software. For instance, a user may navigate an application view using a user device, such as a touchpad, or select HTTP link 312 using a keypad or mouse. The interface functionality provided by the integration of user interface software with user interface devices can be understood to be part of user interface 321.

Memory 323 may comprise any storage media readable by processing system 322 and capable of storing software. Memory 323 may include volatile and nonvolatile, removable and non-removable media implemented in any method or technology for storage of information, such as computer readable instructions, data structures, program modules, or other data. Memory 323 may be implemented as a single storage device but may also be implemented across multiple storage devices or sub-systems. Memory 323 may comprise additional elements, such as a controller, capable of communicating with processing system 322. Examples of storage media include random access memory, read only memory, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software stored on or in memory 323 may comprise computer program instructions, firmware, or some other form of machine-readable processing instructions having processes that when executed by processing system 322 direct user communication device 310 to operate as described herein. For example, software of modules 324 drive user communication device 310 to display HTTP links associated with media resources, display delivery time menus or other menus responsive to user selections, receive user instructions for the media resources, generate and transfer HTTP requests including modified HTTP headers, receive media resources, and display the media resources, among other operations. The software may also include user software applications. The software may be implemented as a single application or as multiple applications. In general, the software may, when loaded into processing system 322 and executed, transform processing system 322 from a general-purpose device into a special-purpose device customized as described herein.

Communication network 330 includes equipment and systems to route packet communications between endpoints over at least communication links 331-332 using network communication protocols, such as Ethernet or Internet protocol (IP). Communication network 330 can comprise routers, switches, gateways, bridges, as well as various network links. Communication network 330 can comprise packet networks, local area networks, wide area networks, metropolitan area networks, wireless communication systems, wireless networks, or cellular voice and data networks, among other networks and systems, including combinations thereof.

Media resource system 340 comprises computer systems and networking interfaces. In some examples, media resource system 340 includes servers, distributed computing systems, network storage devices, web servers, cloud servers, or other computer systems. Media resource system 340 can include communication interfaces, computer systems, microprocessors, circuitry, computer-readable media, or other processing devices or software systems, and may be distributed among multiple processing devices. Media resource system 340 can also include software such as an operating system, logs, utilities, drivers, databases, data structures, networking software, and other software stored on computer-readable media. Media resource system 340 can also include an application server, application service provider system, database system, or other systems. In FIG. 3, media resource system 340 includes media resources 341 which can include data files, digital pictures, digital videos, digital audio, streaming media resources, digital video episodes, digital movies, digital television shows, or other media resources, including combinations thereof. Media resource system 340 also includes timing system 342, which can include software or systems to deliver media resources 341 according to delivery time schedule instructions received from user communication devices.

Figure 4:
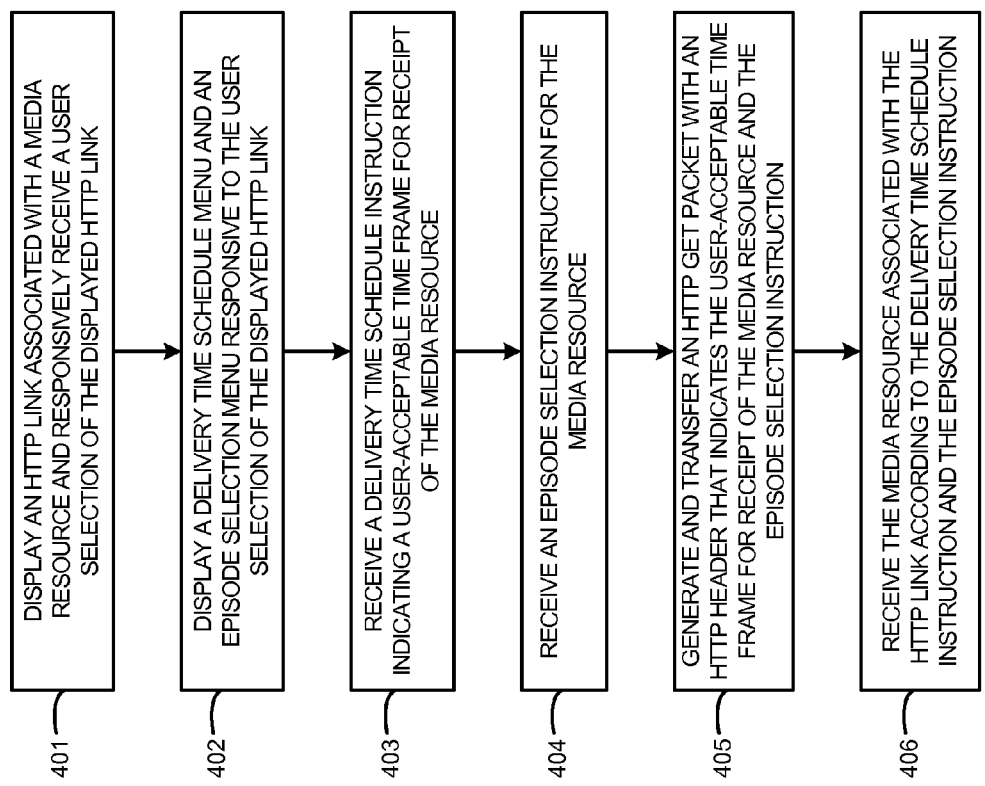
FIG. 4 is a flow diagram illustrating a method of operation of a user communication device.

FIG. 4 is a flow diagram illustrating a method of operation of user communication device 310. The operations of FIG. 4 are referenced herein parenthetically. In FIG. 4, user communication device 310 displays (401) HTTP link 312 associated with a media resource and responsively receives a user selection of displayed HTTP link 312. As shown in FIG. 3, graphical display 311 displays HTTP link 312 indicating "www.alpha.com" representing a URL or Internet address for a media resource. The user selects HTTP link 312 in this example via a mouse click, touch, gesture, voice command, or other user input.

User communication device 310 displays (402) a delivery time schedule menu and an episode selection menu responsive to the user selection of the displayed http link. Responsive to the user selection of HTTP link 312, menu 313 is displayed. Menu 313 can comprise a popup menu, a window, a full-screen menu, dialog box, or other graphical or textual display elements. In some examples, a primary selection method causes menu 313 do be displayed, such as via a left-button mouse click, touchscreen tap, or the like. In other examples, a secondary selection method causes menu 313 to be displayed, such as a right-button mouse click, key press and mouse combination, tap-and-hold action, or the like.

Menu 313 includes a delivery time schedule menu and an episode selection menu in this example. The delivery time schedule menu can include a listing of delivery times for the media resource, such as "deliver no later than . . . ," "deliver no later than 8:00 pm . . . ," "deliver in one hour or less . . . ," "deliver within one day . . . ," or other delivery choices, such as exact delivery times or user-specified timeframes. Certain media resources can be broken into episodic pieces, such as television shows, movie sequels, instructional sessions, airing dates, and the like. The episode selection menu can include selections for additional media resource episode delivery options, such as "deliver the last aired episode . . . ," "deliver the last 3 episodes . . . ," "deliver all episodes of season 1 . . . ," or other selections for the media resource itself, such as video or audio quality selections.

User communication device 310 receives (403) a delivery time schedule instruction indicating a user-acceptable time frame for receipt of the media resource. The user can select from menu 313 a desired delivery time from the delivery time schedule menu, or specify a custom delivery time. User communication device 310 interprets this user selection of a delivery time as a delivery time schedule instruction indicating a user-acceptable time frame for receipt of the media resource. User communication device 310 receives (404) an episode selection instruction for the media resource. The user can select from menu 313 a desired episode delivery option. User communication device 310 interprets this desired episode delivery option as an episode selection instruction for the media resource.

User communication device 310 generates and transfers (405) HTTP GET packet 350 with an HTTP header that indicates the user-acceptable time frame for receipt of the media resource and the episode selection instruction. It should be understood that the episode selection instruction can be excluded from the HTTP header in some examples. An HTTP GET packet or packets can be used as a request to retrieve a media resource from a media resource system, such as media resources 341 from media resource system 340 over communication network 340. The HTTP GET request can also include header information, which can specify further parameters for the HTTP GET request. In this example, the HTTP GET header includes additional fields indicating the user-acceptable time frame for receipt of the media resource and the episode selection instruction. These header fields can include a preamble portion, such as a label followed by a colon (e.g., "delivery timeframe:" and "episode selection:"), or can have other formats, with the delivery timeframe or episode selection included after the preamble portion of the header field. Regardless of the format of the additional header fields, this information is included in the HTTP GET request header portion in this example. Thus, HTTP GET packet (or packets) 350 are generated responsive to the user selection of HTTP link 312 and options from menu 313, and are transferred over link 331 for delivery to media resource system 340.

User communication device 310 receives (406) the media resource associated with the HTTP link according to the delivery time schedule instruction and/or the episode selection instruction. Once media resource system 340 receives HTTP GET 350, with associated header fields discussed above, media resource system 340 identifies a media resource from media resources 341 for delivery to user communication device 310. The media resource identified can include one or more episodes of a media resource, according to the episode selection instruction included in the header of HTTP GET 350. Additionally, media resource system 340 processes the delivery time schedule instruction in HTTP GET 350 with at least timing process 342 to determine a delivery time for the media resource. Once the delivery time has been reached, media resource system 340 transfers the identified media resource(s) 351 for delivery to user communication device 310 over link 332. In some examples, media resource(s) 351 include video files, audio files, container files, or can include the initiation of a streaming process to stream media resource(s) 351 for delivery to user communication device 310. User communication device 310 then receives media resource(s) 351 over link 331 and communication network 330.

In some examples, user communication device 310 displays, plays, or streams one or more of media resource(s) 351 on a graphical display to a user, such as display 311 responsive to receiving media resource(s) 351. In other examples, audio media resources or other audio data is presented to a user via an audio-based user interface, such as a speaker, headphone, audio output, or other audio presentation element, such as in examples of streaming audio where video or graphical media resources are not necessarily presented to a user or are presented in conjunction with graphical or video media resources. In yet other examples, user communication device 310 receives media resource(s) 351 and stores media resource(s) 351 in memory 323 for later retrieval and presentation to a user. In yet further examples, responsive to media resource(s) 351 being received into user communication device 310, a presentation prompt associated with media resource(s) 351 is displayed on display 311. A user can then make a selection through the presentation prompt as to whether user communication device 310 should display media resource(s) 351, store media resource(s) 351 for later use, or cancel display of media resource(s) 351, among other operations. The presentation prompt can comprise a popup menu, a window, a full-screen menu, dialog box, or other graphical or textual display elements.

Referring back to FIG. 1, user communication device 110 comprises network communication circuitry, graphical display elements, and user input elements. The network communication circuitry typically includes network interface cards, transceivers, wireless or wired interfaces, and signal processing circuitry, including combinations thereof. The graphical display elements can include displays, touchscreens, video displays, speakers, video monitors, or other display elements, including combinations thereof. The user input elements can include a mouse, keyboard, keypad, microphone, touchscreen, touchpad, touch screen, hand controller, motion recognition device, video camera, or other user input device, including combinations thereof. User communication device 110 also includes user interface systems, memory devices, non-transitory computer-readable storage mediums, software, processing circuitry, or some other communication components. User communication device 110 can be a user device, subscriber equipment, customer equipment, access terminal, smartphone, telephone, mobile wireless telephone, personal digital assistant (PDA), computer, tablet computer, notebook computer, e-book, mobile Internet appliance, wireless network interface card, media player, game console, or some other wireless communication apparatus, including combinations thereof.

Communication link 130 uses metal, glass, optical, air, space, or some other material as the transport media. Communication link 130 can use various communication protocols and communication formats, such as Internet Protocol (IP), Ethernet, Time Division Multiplexing (TDM), asynchronous transfer mode (ATM), synchronous optical networking (SONET), hybrid fiber-coax (HFC), circuit-switched, communication signaling, wireless communications, or some other communication format, including combinations, improvements, or variations thereof. Communication link 130 can be a wireless link and use various communication protocols and communication formats, such as Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Long Term Evolution, LTE Advanced, Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), including combinations, variations, and improvements thereof. Communication link 130 can each be a direct link or may include intermediate networks, systems, or devices, and can include a logical network link transported over multiple physical links.

Although one main link for communication link 130 is shown in FIG. 1, it should be understood that communication link 130 is merely illustrative to show communication modes or wireless access pathways for user communication device 110. In other examples, further links can be shown, with portions of the further links shared and used for different communication sessions or different content types, among other configurations. Communication link 130 may include many different signals sharing the same associated link, as represented by the associated line in FIG. 1, comprising resource blocks, access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a user communication device having a graphical display, the method comprising:
   displaying a Hypertext Transfer Protocol (HTTP) link associated with a media resource and responsively receiving a user selection of the displayed HTTP link;
   displaying a delivery time schedule menu for the media resource responsive to the user selection of the displayed HTTP link;
   responsive to the displayed delivery time schedule menu, receiving a delivery time schedule instruction on the user communication device indicating a user-acceptable time frame for receipt of the media resource in the user communication device;
   generating and transferring an HTTP request packet with an HTTP header that indicates the user-acceptable time frame for receipt of the media resource into the user communication device; and
   receiving the media resource associated with the HTTP link according to the delivery time schedule instruction and responsive to the HTTP header in the transferred HTTP request packet.

2. The method of claim 1, wherein the HTTP request packet comprises an HTTP GET request.

3. The method of claim 1, wherein the HTTP header comprises a header portion of an HTTP GET request.

4. The method of claim 1, wherein displaying the HTTP link comprises displaying the HTTP link in a web browser application on the user communication device.

5. The method of claim 1, wherein displaying the delivery time schedule menu for the media resource responsive to the user selection of the displayed HTTP link comprises displaying a popup menu comprising the delivery time schedule menu.

6. The method of claim 1, further comprising:
   responsive to receiving the media resource, displaying the media resource on the graphical display of the user communication device.

7. The method of claim 1, further comprising:
   displaying a presentation prompt associated with the media resource responsive to receipt of the media resource, and responsive to a user selection of the presentation prompt, displaying the media resource on the graphical display of the user communication device.

8. The method of claim 1, further comprising:
   displaying an episode selection menu for the media resource responsive to the user selection of the displayed HTTP link;
   responsive to the episode selection menu, receiving an episode selection instruction on the user communication device;
   wherein generating and transferring the HTTP request packet further comprises generating and transferring the HTTP request packet with the HTTP header that further indicates the episode selection instruction for the media resource; and
   receiving the media resource associated with the HTTP link according to the episode selection instruction and according to the delivery time schedule instruction.

9. A computer readable medium having stored thereon program instructions executable by a user communication device that, when executed by the user communication device, direct the user communication device to:
   display a Hypertext Transfer Protocol (HTTP) link associated with a media resource and responsively receive a user selection of the displayed HTTP link;
   display a delivery time schedule menu for the media resource responsive to the user selection of the displayed HTTP link;
   responsive to the displayed delivery time schedule menu, receive a delivery time schedule instruction on the user communication device indicating a user-acceptable time frame for receipt of the media resource in the user communication device;
   generate and transfer an HTTP request packet with an HTTP header that indicates the user-acceptable time frame for receipt of the media resource into the user communication device; and
   receive the media resource associated with the HTTP link according to the delivery time schedule instruction and responsive to the HTTP header in the transferred HTTP request packet.

10. The computer readable medium of claim 9, wherein the HTTP request packet comprises an HTTP GET request.

11. The computer readable medium of claim 9, wherein the HTTP header comprises a header portion of an HTTP GET request.

12. The computer readable medium of claim 9, wherein the program instructions, when executed by the user communication device, direct the user communication device to display the HTTP link in a web browser application on the user communication device.

13. The computer readable medium of claim 9, wherein the program instructions, when executed by the user communication device, direct the user communication device to display a popup menu comprising the delivery time schedule menu.

14. The computer readable medium of claim 9, wherein the program instructions, when executed by the user communication device, direct the user communication device to display the media resource on a graphical display of the user communication device responsive to receiving the media resource.

15. The computer readable medium of claim 9, wherein the program instructions, when executed by the user communication device, direct the user communication device to display a presentation prompt associated with the media resource responsive to receipt of the media resource, and responsive to a user selection of the presentation prompt, display the media resource on a graphical display of the user communication device.

16. The computer readable medium of claim 9, wherein the program instructions, when executed by the user communication device, direct the user communication device to:
   display an episode selection menu for the media resource responsive to the user selection of the displayed HTTP link;
   responsive to the episode selection menu, receive an episode selection instruction on the user communication device;
   generate and transfer the HTTP request packet with the HTTP header that further indicates the episode selection instruction for the media resource; and receive the media resource associated with the HTTP link according to the episode selection instruction and according to the delivery time schedule instruction.

17. A user communication device, comprising:

a graphical display configured to display a Hypertext Transfer Protocol (HTTP) link associated with a media resource;

a user interface configured to receive a user selection of the displayed HTTP link;

the graphical display configured to display a delivery time schedule menu for the media resource responsive to the user selection of the displayed HTTP link;

responsive to the displayed delivery time schedule menu, the user interface configured to receive a delivery time schedule instruction on the user communication device indicating a user-acceptable time frame for receipt of the media resource in the user communication device;

a network interface configured to generate and transfer an HTTP request packet with an HTTP header that indicates the user-acceptable time frame for receipt of the media resource into the user communication device; and the network interface configured to receive the media resource associated with the HTTP link according to the delivery time schedule instruction and responsive to the HTTP header in the transferred HTTP request packet.

18. The user communication device of claim 17, wherein the HTTP request packet comprises an HTTP GET request.

19. The user communication device of claim 17, wherein the HTTP header comprises a header portion of an HTTP GET request.

20. The user communication device of claim 17, comprising:

responsive to receiving the media resource, the graphical display configured to display the media resource.

\* \* \* \* \*